(12) United States Patent
Toyoda

(10) Patent No.: US 12,126,772 B2
(45) Date of Patent: Oct. 22, 2024

(54) INFORMATION PROCESSING DEVICE AND PROGRAM FOR ALLOWING INFORMATION NO LONGER SHARED BY A PLURALITY OF USERS TO BE USED BY A PREVIOUS USER OF THE INFORMATION

(71) Applicant: FUJIFILM CORPORATION, Tokyo (JP)

(72) Inventor: Akihito Toyoda, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 18/546,785

(22) PCT Filed: Feb. 1, 2022

(86) PCT No.: PCT/JP2022/003812
§ 371 (c)(1),
(2) Date: Aug. 17, 2023

(87) PCT Pub. No.: WO2022/181255
PCT Pub. Date: Sep. 1, 2022

(65) Prior Publication Data
US 2024/0137448 A1 Apr. 25, 2024
US 2024/0236243 A9 Jul. 11, 2024

(30) Foreign Application Priority Data
Feb. 24, 2021 (JP) ................. 2021-027638

(51) Int. Cl.
H04N 1/00 (2006.01)
(52) U.S. Cl.
CPC ..... *H04N 1/00087* (2013.01); *H04N 1/00076* (2013.01); *H04N 1/00413* (2013.01); *H04N 2201/0094* (2013.01)
(58) Field of Classification Search
None
See application file for complete search history.

(56) References Cited

U.S. PATENT DOCUMENTS

2014/0071476 A1* 3/2014 Aritomi ................ G06F 21/608
358/1.14
2018/0217797 A1* 8/2018 Inoue ................. H04N 1/00408

FOREIGN PATENT DOCUMENTS

JP 2018-125687 A 8/2018
JP 2020-042555 A 3/2020

* cited by examiner

*Primary Examiner* — Andrew H Lam
(74) *Attorney, Agent, or Firm* — SOLARIS Intellectual Property Group, PLLC

(57) ABSTRACT

In the present invention, when an instruction has been received to delete shared job history information, from among job history information stored in a job history storage unit 37, that has been set in a shared manner so as to be available to a plurality of users, a controller 35 provides notification that a usage history by another user exists if a usage history by another user other than a managing user of the shared job history information exists.

15 Claims, 17 Drawing Sheets

FIG.4

EXAMPLE OF INDIVIDUAL JOB HISTORY
INFORMATION MANAGEMENT TABLE

| NAME | TYPE OF JOB | SETTING CONTENT | LAST USE DATE AND TIME | MANAGEMENT USER | PINNING |
|---|---|---|---|---|---|
| 2 COPIES | COPY | NUMBER: 2 COPIES MAGNIFICATION:100% SHEET: A4 | 2020/7/12 12:01 | USER A | ○ |
| PAID VACATION APPLICATION | FAX | DESTINATION:03-1111-1111 QUALITY: NORMAL | 2020/6/3 10:26 | USER F | ○ |
| FAX TO TRAVEL COMPANY | FAX | DESTINATION:045-123-4567 QUALITY: :PHOTO SHEET | 2019/12/4 11:18 | USER B | ○ |
| SCAN TO ○○ | SCAN | ADDRESS: abc@def.com | 2020/9/9 8:36 | USER C | |
| △△△ PRINT | PRINT | 3 COPIES SHEET: A4 DOUBLE-SIDED | 2020/9/9 9:45 | USER A | |
| SCAN TO OWN | SCAN | ADDRESS: zzz@abcd.co.jp | 2020/9/9 10:23 | USER B | |
| APPLICANT SCAN | SCAN | ADDRESS: aaa@bbb.cc.com | 2020/9/9 12:22 | USER C | |
| ···· | ···· | ···· | ···· | ···· | |

{ PINNED STATE } (first three rows)

FIG.5

EXAMPLE OF SHARED JOB HISTORY INFORMATION MANAGEMENT TABLE

| NAME | TYPE OF JOB | SETTING CONTENT | USE HISTORIES OF OTHER USERS | LAST USE DATE AND TIME | MANAGEMENT USER |
|---|---|---|---|---|---|
| OVERTIME APPLICATION | FAX | DESTINATION:03-2222-2222 QUALITY: NORMAL | [1]USER F [2]USER E | [1]2020/9/1 10:21 [2]2020/9/9 15:03 | USER A |
| FAX TO TRAVEL COMPANY | FAX | DESTINATION:045-123-4567 QUALITY: :PHOTO SHEET | — | — | USER B |
| SCAN TO ○○ | SCAN | ADDRESS: aaa@bbb.cc.com | [1]USER G | [1]2020/9/29 8:36 | USER C |

FIG.14
CASE WHERE THERE ARE USE HISTORIES OF PLURALITY OF USERS
SHARED JOB HISTORY
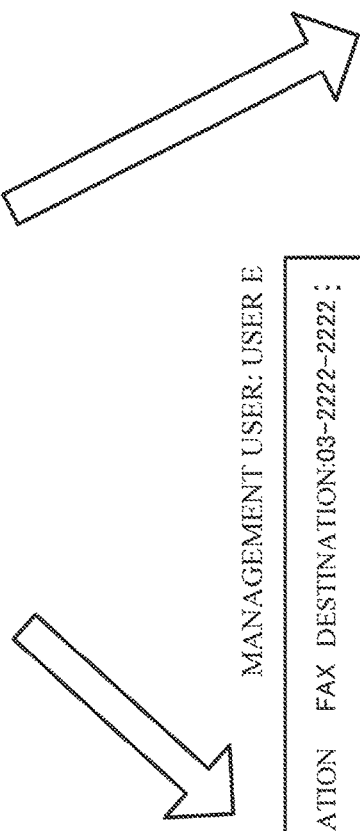
OVERTIME APPLICATION  FAX  DESTINATION:03-2222-2222    USER A  ...
MANAGEMENT USER: USER E
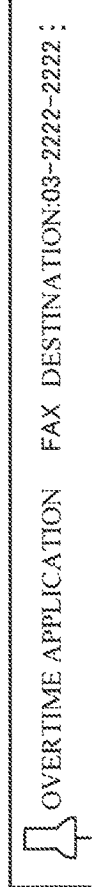
OVERTIME APPLICATION  FAX  DESTINATION:03-2222-2222 ;
INDIVIDUAL JOB HISTORY
MANAGEMENT USER: USER F
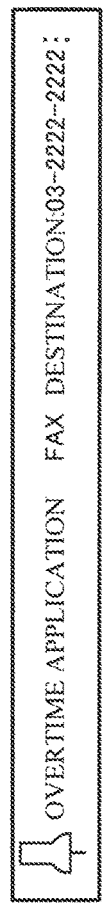
OVERTIME APPLICATION  FAX  DESTINATION:03-2222-2222 ;
INDIVIDUAL JOB HISTORY CASE OF REMAINING AS SHARED JOB HISTORY SINCE THERE ARE USE HISTORIES OF PLURALITY OF USERS

INFORMATION PROCESSING DEVICE AND PROGRAM FOR ALLOWING INFORMATION NO LONGER SHARED BY A PLURALITY OF USERS TO BE USED BY A PREVIOUS USER OF THE INFORMATION

TECHNICAL FIELD

The technology of the present disclosure relates to an information processing device and a program.

BACKGROUND ART

Japanese Patent Application Laid-Open (JP-A) No. 2018-125687 discloses an image processing device that prevents deletion of a history of jobs selected by a user from a storage unit even when there is an upper limit to the number of jobs that can be stored in the storage unit and a stored job is deleted when the number of jobs exceeds the upper limit.

Japanese Patent Application Laid-Open (JP-A) No. 2020-042555 discloses a control device that performs control such that an authority set in a selection button is changed from one of sharing and individual to the other according to a use situation of the selection button when any one of a sharing authority that enables all users to make use and an individual authority that enables a specific user to make use is set and control is performed to display a plurality of selection buttons associated with an application to be executed is displayed on a display unit.

SUMMARY OF INVENTION

Technical Problem

An object of the present disclosure is to provide an information processing device and a program capable of preventing occurrence of a situation in which, due to deletion of process execution information of a sharing setting available to a plurality of users by a management user of the process execution information, another user who has used the process execution information cannot use the process execution information.

Solution to Problem

An information processing device of a first aspect includes a processor. In a case in which the processor receives an instruction to delete process execution information in which a sharing setting available to a plurality of users is made from among pieces of process execution information for executing a present process, the processor gives a notification that there is a use history of another user in a case in which there is the use history of the other user other than a management user of the process execution information.

An information processing device of a second aspect is the information processing device of the first aspect, in which the processor deletes the process execution information in a case in which the processor receives an instruction to delete the process execution information by the management user who has given the notification.

An information processing device of a third aspect is the information processing device of the first aspect, wherein, in a case in which the processor receives an instruction to change a management user without deleting the process execution information by the management user who has given the notification, the processor changes the process execution information to process execution information of a sharing setting in which a preset user is the management user.

An information processing device of a fourth aspect is the information processing device of the third aspect, wherein the preset user is a machine manager preset as a manager of the information processing device.

An information processing device of a fifth aspect is the information processing device of the first aspect, wherein, in a case in which the processor receives an instruction to change the management user and leaves the process execution information without deleting the process execution information by the management user who has given the notification, the processor changes the process execution information to process execution information of an individual setting that is available only to another user having a use history as the management user.

An information processing device of a sixth aspect is the information processing device of the first aspect, wherein the processor receives an instruction to change the management user and leaves the process execution information without deleting the process execution information by the management user who has given the notification, and in a case in which there is a plurality of other users having a use history of the process execution information, the processor changes the process execution information to process execution information of a sharing setting in which another user selected from the plurality of other users is the management user.

An information processing device of a seventh aspect is the information processing device of the sixth aspect, wherein the processor selects, as the management user of the process execution information, a user having a highest use frequency or a user having a largest number of uses among a plurality of other users having the use history of the process execution information.

An information processing device of an eighth aspect is the information processing device of the sixth aspect, wherein the processor sets, as a new management user of the process execution information, a user selected by an original management user from a plurality of other users having the use history of the process execution information.

An information processing device of a ninth aspect is the information processing device of the first aspect, in which the processor receives an instruction to change the management user and leaves the process execution information without deleting the process execution information by the management user who has given the notification, and in a case in which there is a plurality of other users having the use history of the process execution information, the processor changes the process execution information to process execution information of a plurality of individual settings in which each of the plurality of other users is a management user.

An information processing device of a tenth aspect includes a processor. In a case in which the processor receives an instruction to delete process execution information in which a sharing setting available to a plurality of users is made from among pieces of process execution information for executing a present process, the processor changes the process execution information to process execution information of an individual setting in which another user is a management user in a case in which there is a use history of the other user other than the management user of the process execution information.

An information processing device of an eleventh aspect is the information processing device of any one of the fifth to tenth aspects, in which in a case in which new process execution information is generated, when a user set as the new management user of the process execution information displays a list screen of the process execution information, the processor gives a notification that the process execution information in which the user is a management user has been generated.

An information processing device of a twelfth aspect is the information processing device of any one of the first to eleventh aspects, in which in a case in which a user other than a management user of the process execution information has used the process execution information a preset number of times or more within a past preset period, the processor determines that there is a use history in the process execution information.

An information processing device of a thirteenth aspect is the information processing device of any one of the first to twelfth aspects, in which the process execution information is history information of process content executed previously, process execution information for sequentially executing a series of preset processes, or process execution information for executing a process with preset setting content.

A program of a fourteenth aspect causes a computer to execute: receiving an instruction to delete process execution information in which a sharing setting available to a plurality of users is made from among pieces of process execution information for executing a present process; and giving a notification that there is a use history of another user other than a management user of the process execution information in a case in which there is the use history of the other user other than the management user of the process execution information.

A program of a fifteenth aspect causes a computer to execute:

receiving an instruction to delete process execution information in which a sharing setting available to a plurality of users is made from among pieces of process execution information for executing a present process; and changing the process execution information to process execution information of an individual setting in which another user is a management user in a case in which there is a use history of the other user other than a management user of the process execution information.

Advantageous Effects of Invention

According to the information processing device of the first aspect, it is possible to prevent occurrence of a situation in which, due to deletion of process execution information of a sharing setting available to a plurality of users by a management user of the process execution information, another user who has used the process execution information cannot use the process execution information.

According to the information processing device of the second aspect, it is possible to delete even process execution information in which there is a use history of another user.

According to the information processing device of the third aspect, it is possible to leave the process execution information of the sharing setting that the original management user intends to delete as the process execution information of the sharing setting with the preset user as the management information.

According to the information processing device of the fourth aspect, the process execution information of the sharing setting that the original management user intends to delete can be left as the process execution information of the sharing setting with the machine manager as the management information.

According to the information processing device of the fifth aspect, the process execution information of the sharing setting that the original management user intends to delete can be left as process execution information of an individual setting in which another user having a use history of the process execution information is used as the management information.

According to the information processing device of the sixth aspect, the user newly set as the management user of the process execution information can know that the user is set as the management user.

According to the information processing device of the seventh aspect, even in a case in which there are the use histories of the plurality of users in the process execution information of the sharing setting that the original management user intends to delete, the process execution information can be left as the process execution information of the sharing setting.

According to the information processing device of the eighth aspect, in a case in which there are the use histories of the plurality of users in the process execution information of the sharing setting that the original management user intends to delete, and the process execution information is left as the process execution information of the sharing setting, it is possible to select the user having the highest use frequency or the user having the largest number of uses as the new management user.

According to the information processing device of the ninth aspect, in a case in which there are use histories of a plurality of users in the process execution information of the sharing setting that the original management user intends to delete, and the process execution information is left as the process execution information of the sharing setting, the original management user can select a new management user.

According to the information processing device of the tenth aspect, in a case in which there are use histories of a plurality of users in the process execution information of the sharing setting that the original management user intends to delete, the process execution information can be left as the process execution information of the individual setting.

According to the information processing device of the eleventh aspect, it is possible to prevent occurrence of a situation in which the process execution information of the sharing setting available to a plurality of users is deleted by the management user of the process execution information, and thus another user who has used the process execution information cannot use the process execution information.

According to the information processing device of the twelfth aspect, it is possible to prevent occurrence of a situation in which the process execution information of the sharing setting available to a plurality of users is deleted by the management user of the process execution information, and thus, another user who has used the process execution information cannot use the process execution information.

According to the information processing device of the thirteenth aspect, it is possible to prevent occurrence of a situation in which the process execution information of the sharing setting available to a plurality of users is deleted by the management user of the process execution information and thus, another user who has used the process execution information cannot use the process execution information.

According to the program of the fourteenth aspect, it is possible to prevent occurrence of a situation in which the process execution information of the sharing setting available to a plurality of users is deleted by the management user of the process execution information, and thus another user who has used the process execution information cannot use the process execution information.

According to the program of the fifteenth aspect, it is possible to prevent occurrence of a situation in which the process execution information of the sharing setting available to a plurality of users is deleted by the management user of the process execution information, and thus another user who has used the process execution information cannot use the process execution information.

BRIEF DESCRIPTION OF DRAWINGS

FIG. 4 is a diagram illustrating an example of an individual job history information management table stored in a job history storage unit 37.

FIG. 5 is a diagram illustrating an example of a shared job history information management table stored in a job history storage unit 37.

FIG. 14 is a diagram illustrating a state in which an individual job history in which each of two users E and F is a management user is generated in a case in which there are the use history in a shared job history to be deleted.

DESCRIPTION OF EMBODIMENTS

Next, embodiments of the present disclosure will be described in detail with reference to the drawings.

Figure 1:
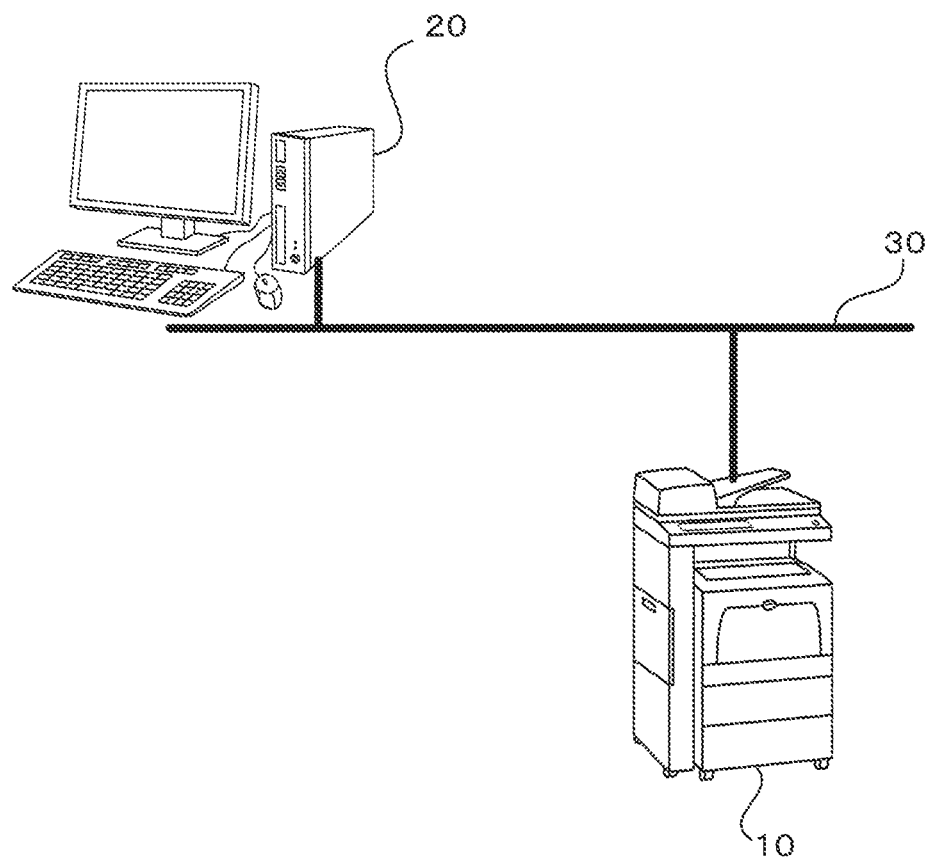
FIG. 1 is a diagram illustrating a system configuration of an image forming system according to an embodiment of the present disclosure.

FIG. 1 is a diagram illustrating a system configuration of an image forming system according to an embodiment of the present disclosure.

As illustrated in FIG. 1, an image forming system according to an embodiment of the present disclosure includes an image forming device 10 and a terminal device 20 connected to each other via a network 30. The terminal device 20 generates print data and transmits the generated print data to the image forming device 10 via the network 30. The image forming device 10 receives print data transmitted from the terminal device 20 and outputs an image corresponding to the print data on a sheet. The image forming device 10 is a so-called multi-function peripheral that has a plurality of functions such as a printing function, a scanning function, a copying function, and a facsimile function.

Figure 2:
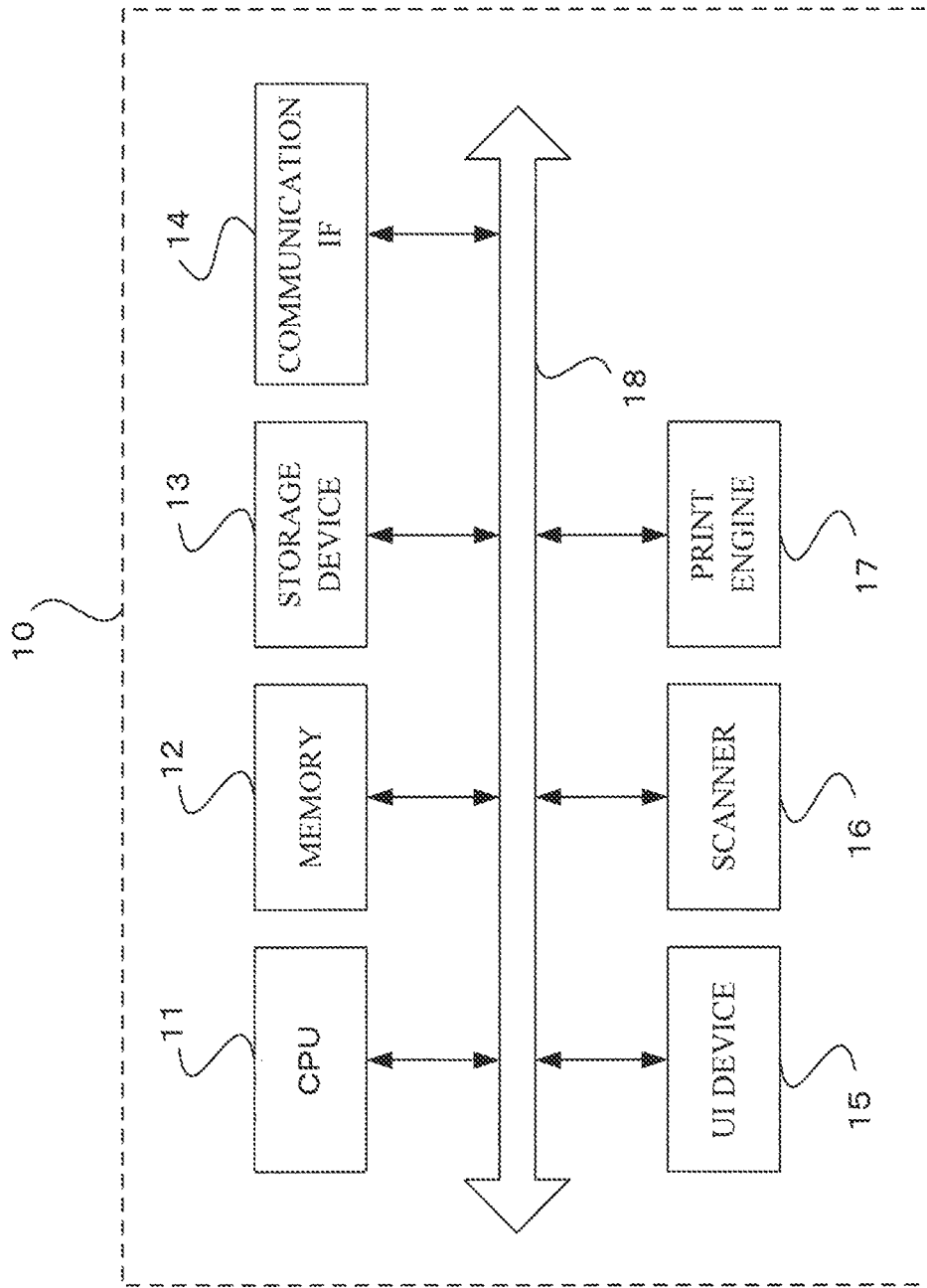
FIG. 2 is a block diagram illustrating a hardware configuration of an image forming device 10 according to an embodiment of the present disclosure.

Next, a hardware configuration of the image forming device 10 in the image forming system of the present embodiment is illustrated in FIG. 2.

As illustrated in FIG. 2, the image forming device 10 includes a CPU 11, a memory 12, a storage device 13 such as a hard disk drive, a communication interface (abbreviated to IF) 14 that transmits and receives data to and from an external device or the like via the network 30, a user interface (abbreviated as UI) device 15 including a touch panel or a liquid crystal display and a keyboard, a scanner 16, and a print engine 17. These constituents are connected to each other via a control bus 18.

The print engine 17 prints an image on a recording medium such as printing paper through processes such as charging, exposure, development, transferring, and fixing.

The CPU 11 is a processor that executes a predetermined process based on a control program stored in the memory 12 or the storage device 13 to control an operation of the image forming device 10. In the present embodiment, the CPU 11 will be described as reading and executing the control program stored in the memory 12 or the storage device 13, but the program may be stored in a storage medium such as a CD-ROM and provided to the CPU 11.

Figure 3:
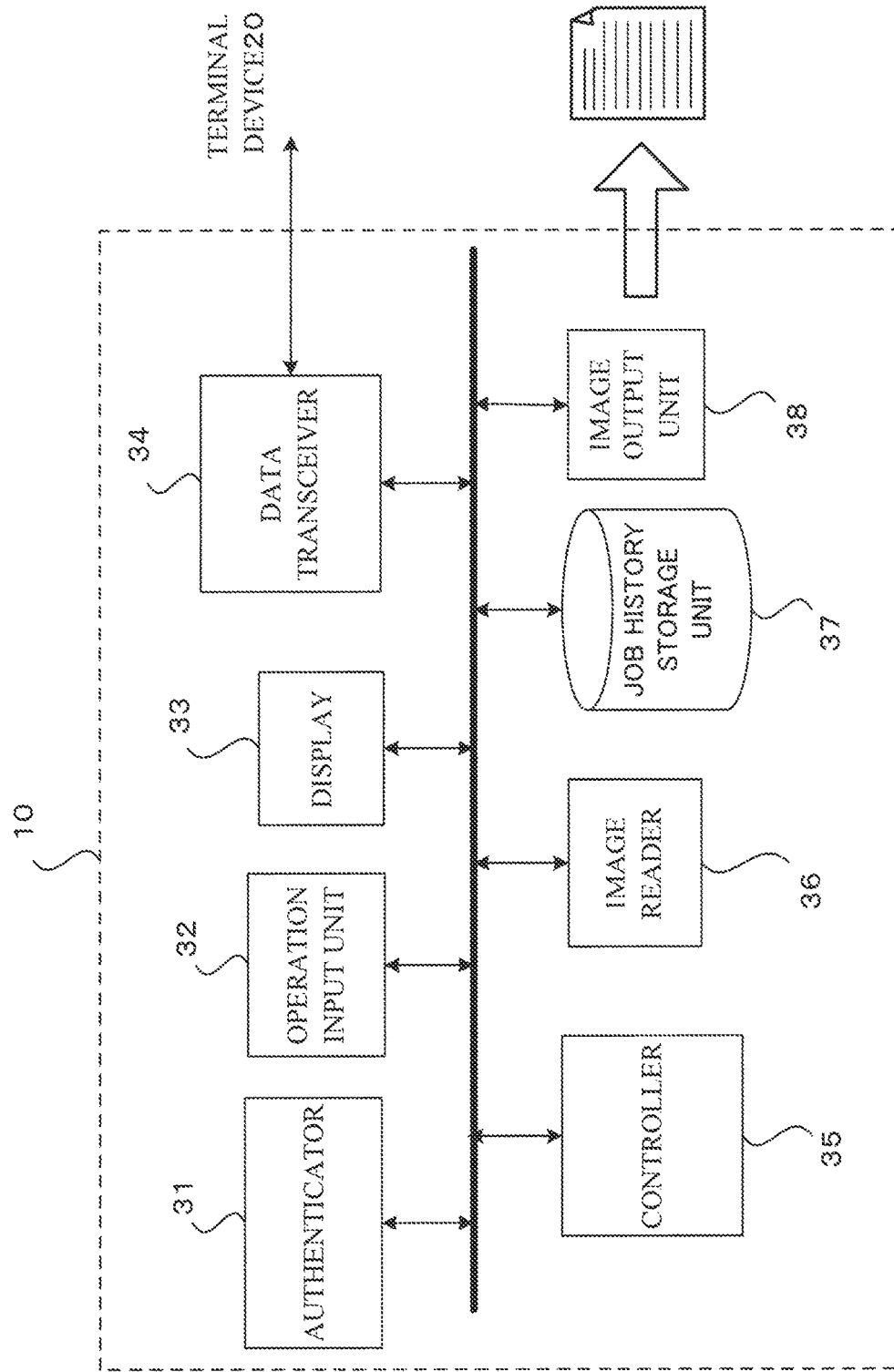
FIG. 3 is a block diagram illustrating a functional configuration of the image forming device 10 according to an embodiment of the present disclosure.

FIG. 3 is a block diagram illustrating a functional configuration of the image forming device 10 implemented by executing the control program.

As illustrated in FIG. 3, the image forming device 10 of the present embodiment includes an authenticator 31, an operation input unit 32, a display 33, a data transceiver 34, a controller 35, an image reader 36, a job history storage unit 37, and an image output unit 38.

The authenticating portion 31 executes an authentication process on a user who intends to use the image forming device 10. The display 33 is controlled by the controller 35 and displays various types of information for the user. The operation input unit 32 inputs various types of operation information performed by the user.

The data transceiver 34 transmits and receives data to and from an external device such as the terminal device 20.

The controller 35 controls all operations of the image forming device 10, generates print data based on the print job received from the terminal device 20 via the data transceiver 34, performs control such that the generated print data is output from the image output unit 38, and performs control such that a document image is read by the image reader 36, and the like. The job history storage unit 37 stores job history information indicating an execution history of various jobs such as a print job, a scan job, a copy job, and a facsimile transmission job executed by the controller 35. Here, the job history information is history information of process content of jobs executed previously.

The image output unit 38 outputs an image on a recording medium such as printing paper under the control of the controller 35. The image reader 36 reads a document image from a set document under the control of the controller 35.

Here, the job history storage unit 37 stores an individual job history information management table for managing individual job history information that is setting content of a job when each user executes the job, and a shared job history information management table for managing shared job history information in which the individual job history information is made available to a plurality of users.

FIG. 4 illustrates an example of the individual job history information management table stored in the job history storage unit 37.

Referring to FIG. 4, information such as a name, a type of job, setting content, a last use date and time, a management user, and presence or absence of pinning of each job executed previously is managed in the individual job history information management table.

When each user is authenticated in the authenticator 31 and logs in to use the image forming device 10, each user can refer to a list of individual job histories in which each user is a management user. Then, when the user desires to execute a job having the same content as that of a job executed previously, the user can select a job history and execute a new job.

Here, the management user is a user who is a possessor or an owner of the job history information, and is a user who has authority to delete and edit the job history information.

Here, a new job history is generated whenever a job is executed. However, a data storage area is limited, and the data storage area is likely to be insufficient if all the job histories are stored. Therefore, for example, an upper limit is set such that only the latest 200 jobs remain in the job history, and the job history exceeding the upper limit is designed to be deleted from the job history of which an execution date and time is older.

Accordingly, it is possible to perform a pinning setting so that a job history that is not desired to be deleted is not to be deleted. For the job history set to be pinned, even when a job executed later exceeds the upper limit number, a process of leaving the job history without being deleted is performed.

For example, referring to the individual job history information management table in FIG. 4, it can be understood that the job history named "2 copies" is pinned. That is, the pinned job history is left regardless of the number of jobs executed later.

The job history illustrated in FIG. 4 is a job history of an individual setting that can be used only by a certain user, specifically, the management user of the job history. However, such a job history may be desired to be used by a plurality of users. Therefore, the individual job history can be changed to the shared job history by setting the individual job history to the sharing setting. The job history set to be shared is available to all logged-in users.

FIG. 5 illustrates an example of a shared job history information management table for managing such a shared job history.

Referring to FIG. 5, in the shared job history information management table, information such as a name of each job, a job type, setting contents, a use history of another user, a final use date and time, and a management user is managed.

Only the management user of the shared job history and the machine manager who is the manager of the image forming device 10 can delete and edit the shared job history. However, even other users can execute a job based on the process content of the shared job history using the shared job history.

For example, referring to the shared job history information management table in FIG. 5, the management user of the shared job history named "overtime application" is "user A", but it can be understood that there is a use history by users E and F.

Then, when the controller 35 receives an instruction to delete the shared job history information in which sharing settings available to a plurality of users are made from among the job history information stored in the job history storage unit 37, the controller 35 notifies that there is a use history of other user other than a management user in a case in which there is a use history of another user of the shared job history information. Specifically, in a case in which there is a use history of another user in the shared job history when the management user attempts to delete the shared job history, the controller 35 notifies the management user that there is a use history of another user by displaying the presence of the use history on the display 33.

When the controller 35 receives an instruction to delete the shared job history information by the management user who has given the notification as described above, the controller 35 deletes the shared job history information.

In a case in which the controller 35 receives an instruction to change the management user and leaves the shared job history information without deleting the shared job history information by the management user who has given the notification as described above, the controller 35 changes the shared job history information to shared job history information in which a preset user is the management user. For example, a machine manager preset as a manager of the own device can be set as a preset user.

In a case in which the controller 35 receives an instruction to change the management user and leaves the shared job history information without deleting the shared job history information by the management user who has given the notification as described above, the controller 35 may change the shared job history information to individual job history information that can be used only by another user having a use history as the management user.

Then, in a case in which new individual job history information or shared job history information is generated, the controller 35 notifies that the individual job history information or the shared job history information in which the user is the management user has been generated when a user set as a new management user of the individual job history information or the shared job history information displays a list screen of job history information.

The controller 35 may receive an instruction to change the management user and leave the shared job history information without deleting the shared job history information by the management user who has given the notification as described above. In a case in which there are a plurality of other users having a use history of the shared job history information, the shared job history information may be changed to shared job history information in which another user selected from the plurality of other users is the management user.

At that time, the controller 35 may automatically select a user having the highest use frequency or a user having the largest number of uses among a plurality of other users having a use history of the shared job history information as a new management user of the shared job history information.

Alternatively, the controller 35 may set a user selected by the original management user from among a plurality of other users having a use history of the shared job history information as a new management user of the shared job history information.

Further, the controller 35 may receive an instruction to change the management user and leaves the shared job history information without deleting the shared job history information by the management user who has given the notification as described above. In a case in which there are a plurality of other users having a use history of the shared job history information, the shared job history information may be changed to a plurality of pieces of individual job history information having each of the plurality of other users as the management user.

In the above description, when the management user of the shared job history information intends to delete the shared job history information having a use record by another user, the management user of the shared job history information is changed or the shared job history information is changed to the individual job history information after it is notified that there is the use record by another user. However, the management user of the shared job history information may be changed or the shared job history information may be changed to the individual job history information without performing such a notification.

For example, when the controller 35 receives an instruction to delete shared job history information available by a plurality of users among the job history information stored in the job history storage unit 37, the controller 35 may change the shared job history information to the process execution information of the individual setting in which another user is a management user without notifying the original management user in a case in which there is a use history of another user of the shared job history information other than the management user.

When a user of the shared job history information other than the management user uses the shared job history information a preset number of times or more within a past preset period, the controller 35 determines that there is a use history in the shared job history information. For example, in a case in which other user other than the management user has used the shared job history information once or more within the past one month, the controller 35 determines that there is a use history of another user in the shared job history information.

In the present embodiment, the case where a new job is executed using a job history which is history information with process content of jobs executed previously has been described, but the present disclosure is not limited to such a case. For example, the present disclosure can be similarly applied to a case where various types of processes are executed using process execution information for executing a preset process such as a job flow for sequentially executing a series of preset processes and a one-touch application for executing a process of a job with preset setting content.

Next, an operation of the image forming device 10 of the present embodiment will be described in detail with reference to the drawings.

Figure 6:
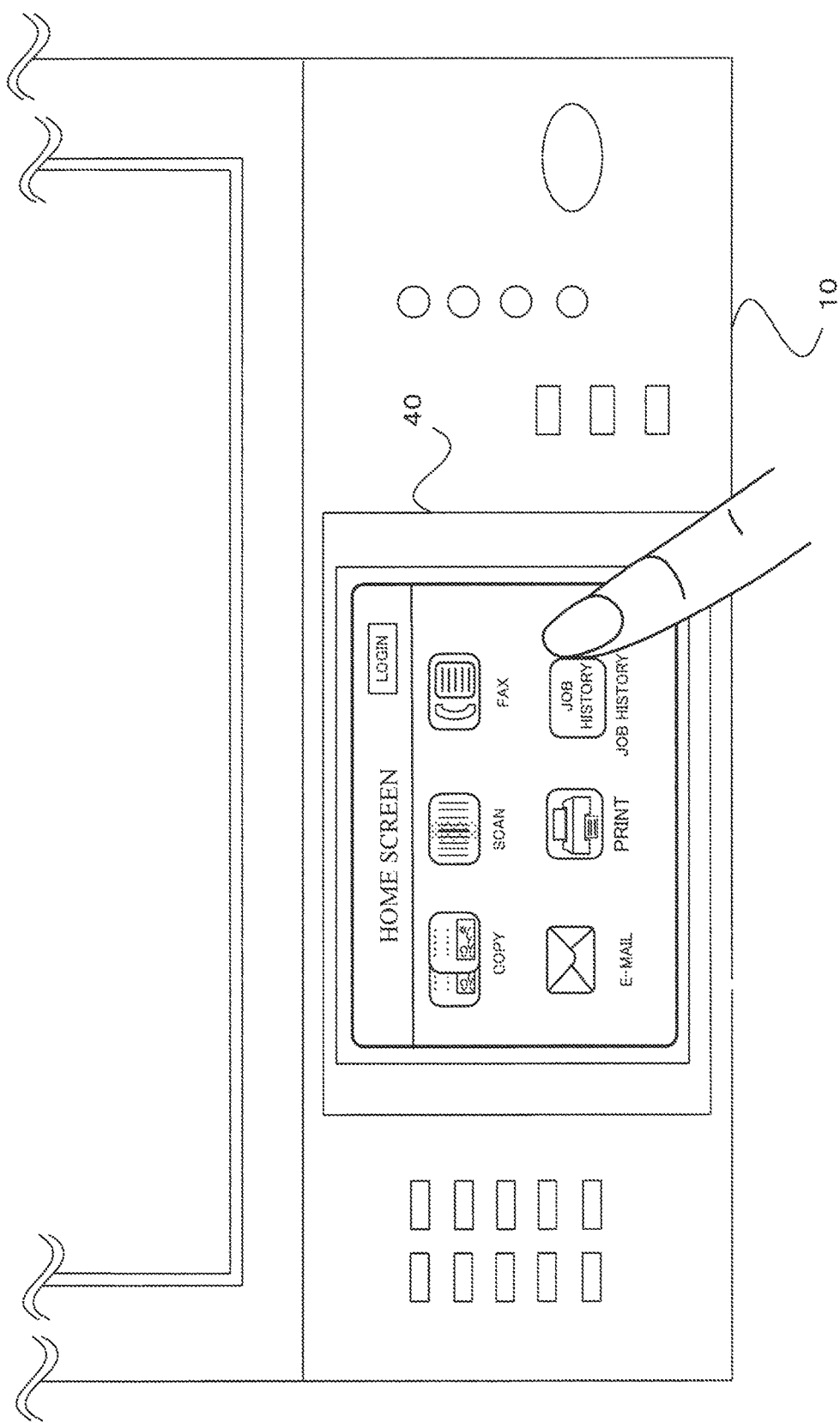
FIG. 6 is a diagram illustrating a display screen example of an operation panel 40 included in the image forming device 10.

First, a display screen example of an operation panel 40 provided in the image forming device 10 is illustrated in FIG. 6. In the display screen example illustrated in FIG. 6, an icon for displaying a list of job histories is provided on the operation panel 40. An example of a job history list display screen displayed in a case in which a user performs a touch operation on this icon is illustrated in FIG. 7.

Figure 7:
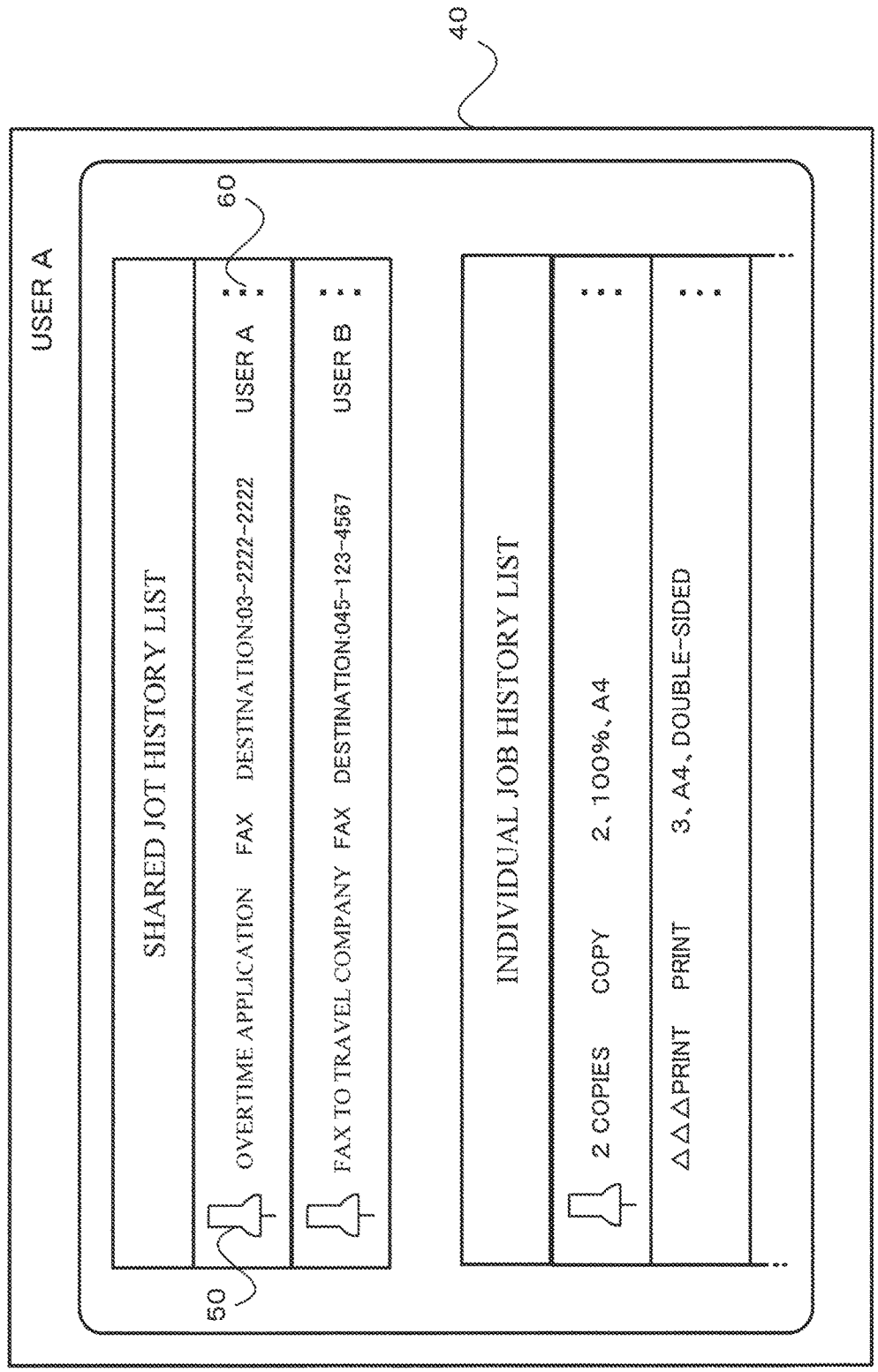
FIG. 7 is a diagram illustrating an example of a list display screen of job histories displayed when a user performs a touch operation on an icon for displaying a list of job histories.

On the job history list display screen illustrated in FIG. 7, it can be understood that the list of the shared job histories and the list of the individual job histories are displayed separately.

The job history list display screen illustrated in FIG. 7 is an example of a display screen displayed in a case in which the user A logs in while the job history information management tables illustrated in FIGS. 4 and 5 are stored in the job history storage unit 37. However, due to a display space, some of the job histories displayed on the job history list display screen are omitted and are not displayed.

Here, on the list display screen illustrated in FIG. 7, both a shared job history in which the user himself or herself is a management user and a shared job history in which another user is a management user are displayed as a shared job history list. However, in FIG. 7, only the individual job history in which the user A who has logged in is the management user is displayed in an individual job history list. Then, an individual job history set to be pinned is displayed in higher priority than an unpinned individual job history, and it can be understood that the individual job history is displayed in a state in which the pinning mark 50 is attached.

When a user intends to execute a job having the same content as that of a job executed previously, the user can execute a job having desired content without performing detailed setting merely by selecting a job history having the same content as that of the job to be executed from the job list displayed in this way.

For example, merely by selecting a shared job history named "overtime application", it is possible to transmit a facsimile to the same destination as usual without inputting destination information and various settings.

Here, the shared job history displayed in the shared job history list and the individual job history in the pinned state displayed in the individual job list are not deleted through execution of another job. However, among the individual job histories displayed in the individual job list, the individual job histories are deleted in a descending order of execution dates and times in a case in which the number of unpinned individual job histories exceeds a storage upper limit number as a job is executed.

The operation menu button 60 is displayed in both the shared job history and the individual job history, and various operations on the shared job history and the individual job history can be executed.

Figure 8:
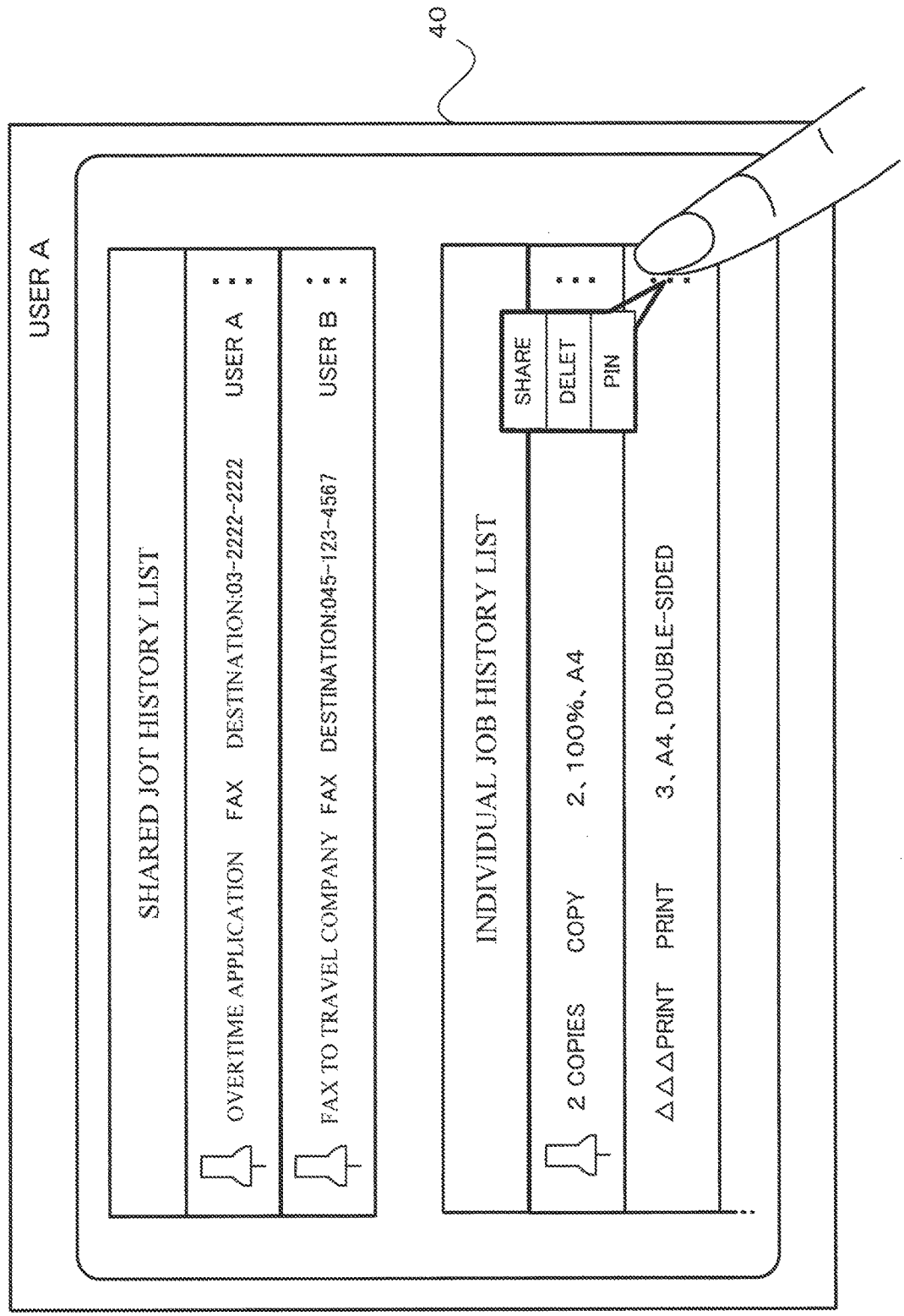
FIG. 8 is a diagram illustrating an example of a list of operation menus displayed when the user operates an operation menu button 60 displayed in an individual job history.

For example, an example of a list of operation menus displayed in a case in which the user operates the operation menu button 60 displayed in the individual job history is illustrated in FIG. 8.

Referring to FIG. 8, it can be understood that an operation menu including operation items of "Share", "Delete", and "Pin" is displayed. When the user selects the operation item "Share" from the operation menu, the individual job history is changed to the shared job history.

Further, when the user selects the operation item "Delete" from the operation menu as illustrated in FIG. 8, the individual job history is deleted. When the user selects the operation item "Pin", the individual job history is pinned. In a case in which the operation menu button 60 of the individual job history in the pinned state is operated, an operation item "Release Pinning" is displayed in the operation menu instead of the operation item "Pin".

Figure 9:
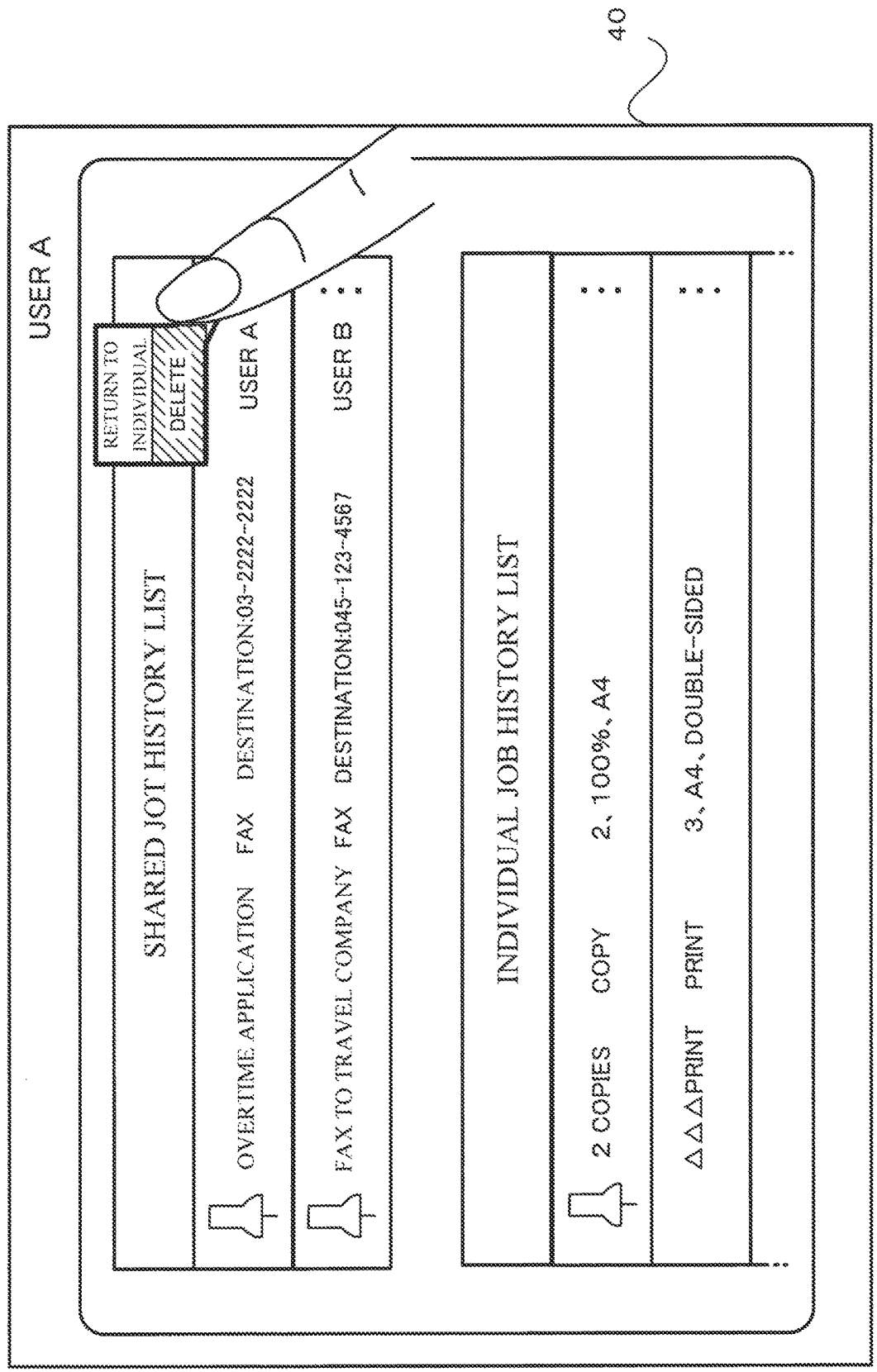
FIG. 9 is a diagram illustrating an example of a list of operation menus displayed when the user operates the operation menu button 60 displayed in the shared job history.

Next, an example of a list of operation menus displayed in a case in which the user operates the operation menu button 60 displayed in the shared job history is illustrated in FIG. 9.

Referring to FIG. 9, it can be understood that an operation menu including operation items of "Return to individual" and "Delete" is displayed. When the user selects the operation item "Return to individual" from the operation menu, the shared job history is returned to the individual job history.

An operation in a case in which the user selects the operation item "Delete" from the operation menu as illustrated in FIG. 9 will be described in detail below.

Here, as illustrated in the shared job history information management table in FIG. 5, the shared job history named "overtime application" to be deleted by the user A includes usage histories by "user F" and "user E".

Figure 10:
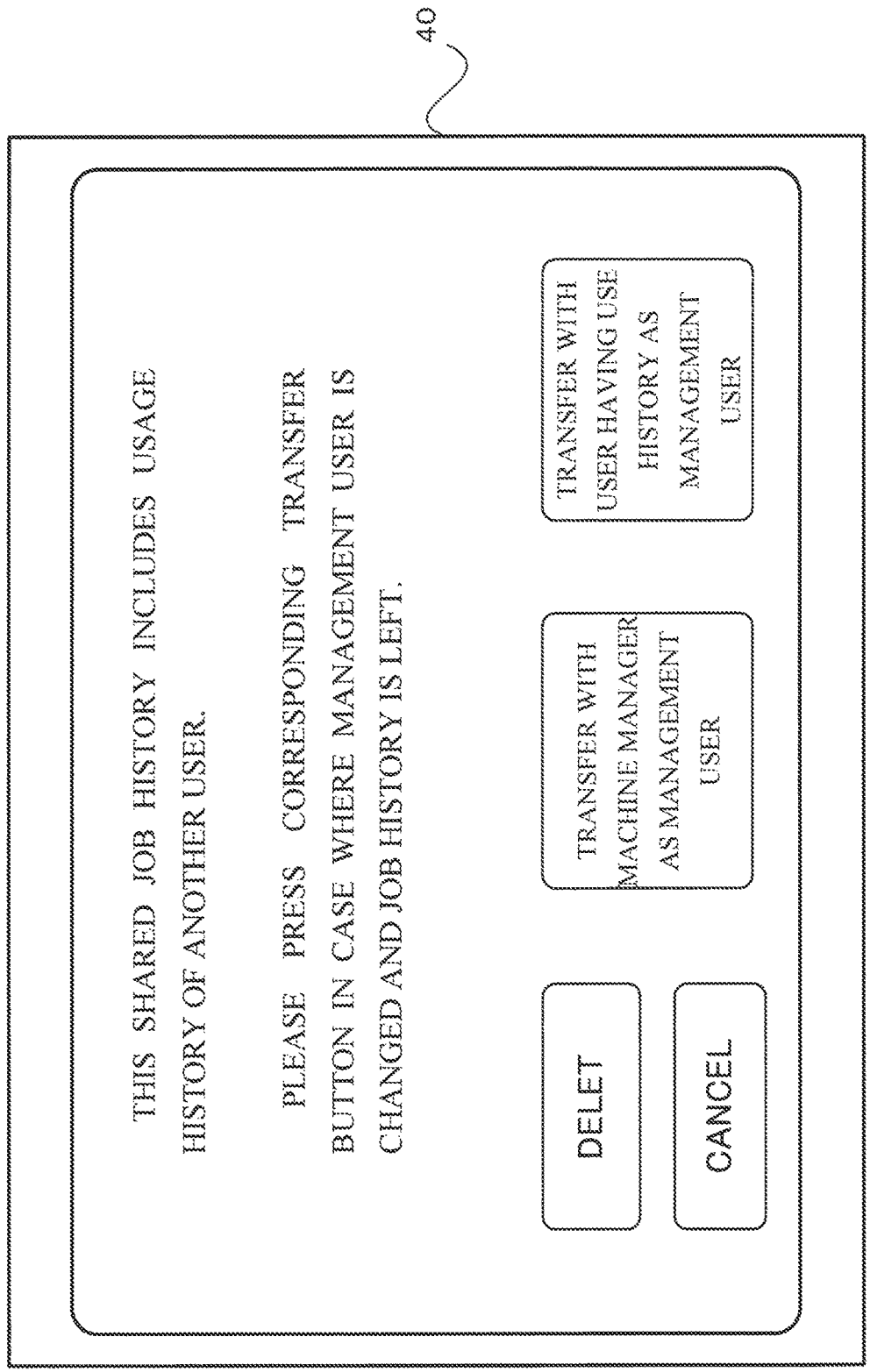
FIG. 10 is a diagram illustrating an example of a notification screen for notifying a user A that there is another user using a shared job history to be deleted.

Therefore, by displaying a display screen on the operation panel 40, as illustrated in FIG. 10, the controller 35 notifies the user A that there is a use history of another user in the shared job history to be deleted. Specifically, by displaying a message such as "THIS shared job history includes usage history of another user. Please press corresponding transfer button in case where management user is changed and job history is left." on the operation panel 40, the user A is notified that there is another user using the shared job history to be deleted.

Here, when the user A presses the "Delete" button, the shared job history is deleted. When the user A presses the "Cancel" button, the deletion of the shared job history is canceled.

Figure 11:
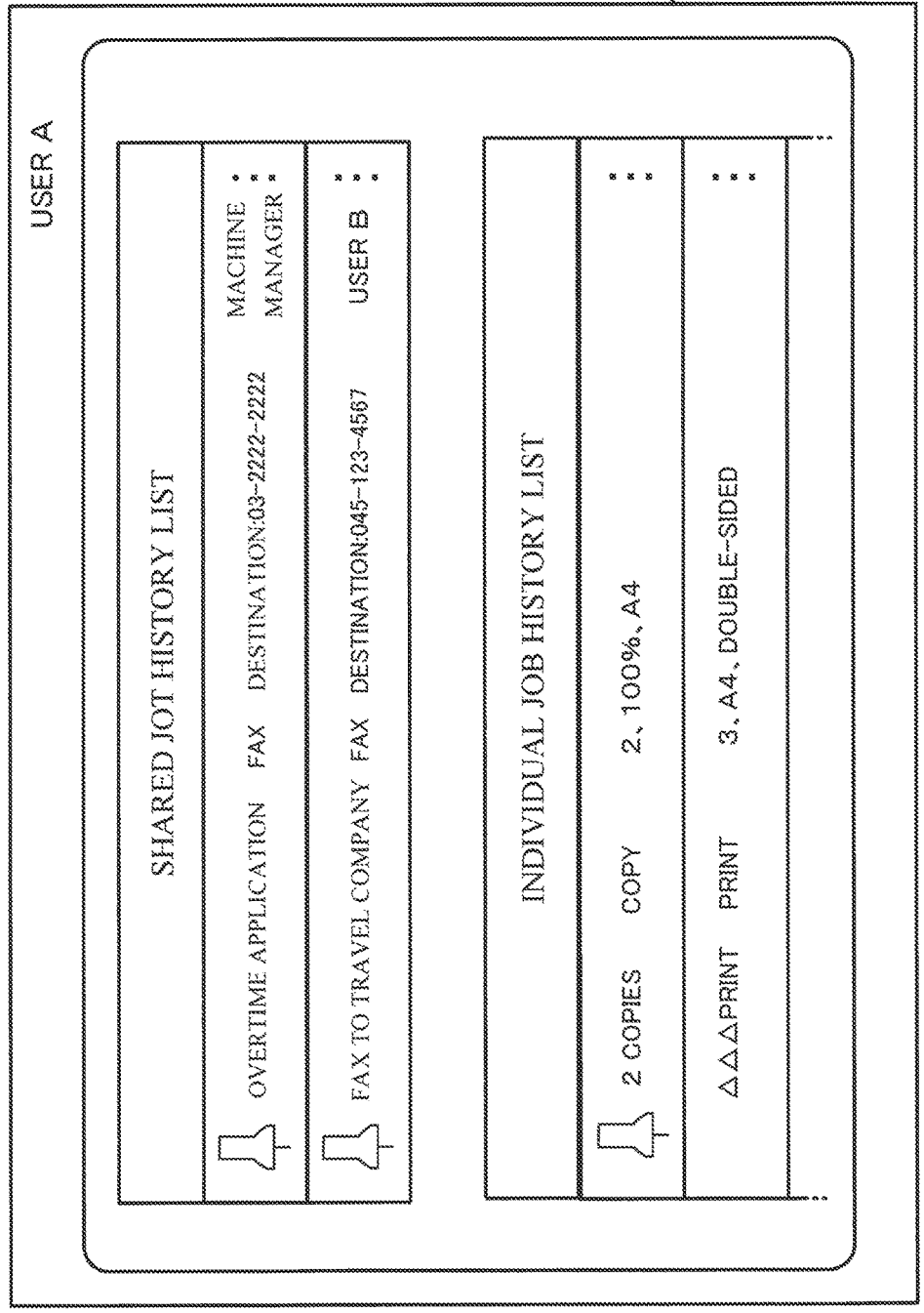
FIG. 11 is a diagram illustrating an operation in a case in which the user A presses a button displayed as "Transfer with machine manager as management user" on the notification screen illustrated in FIG. 10.

Then, an operation in a case in which the user A presses a button displayed as "Transfer with machine manager as management user" on the notification screen illustrated in FIG. 10 will be described with reference to FIG. 11. When the user A selects to transfer the shared job history to the machine manager, it can be understood that the management user of the shared job history named "overtime application" is changed from the user A to the machine manager, as illustrated in FIG. 11.

Figure 12:
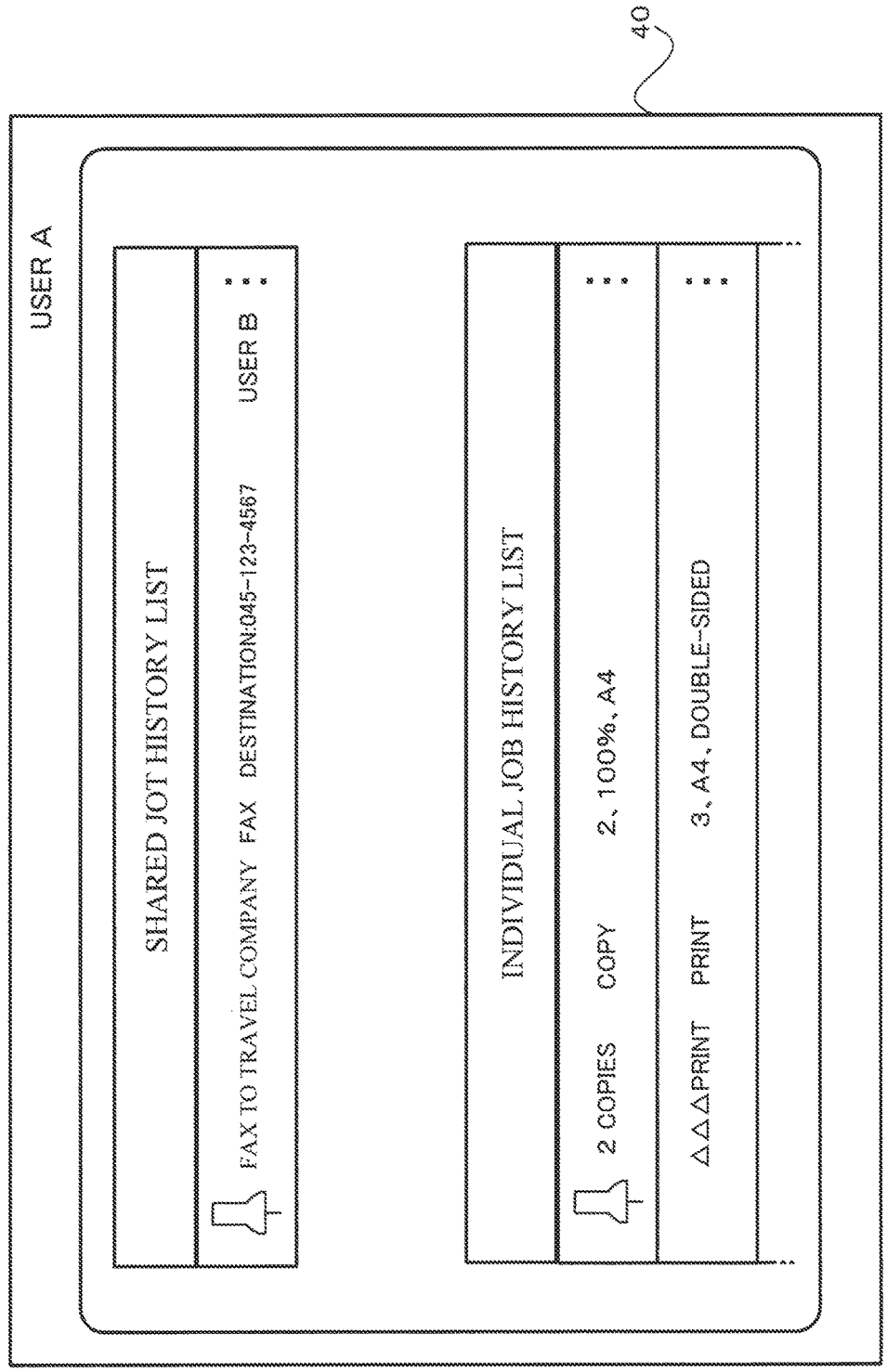
FIG. 12 is a diagram illustrating an operation in a case in which the user A presses a button displayed as "Transfer with a user with a use history as a management user" on the notification screen illustrated in FIG. 10.

Then, an operation in a case in which the user A presses a button displaying "Transfer with user having use history as management user" on the notification screen illustrated in FIG. 10 will be described with reference to FIG. 12. When the user A selects to transfer the shared job history to another user having a use history, as illustrated in FIG. 12, the management user of the shared job history having the name of "overtime application" is changed to another user, is further changed to the individual job history of the user, and thus is not displayed on the list screen of the job history of the user A.

For example, in a case in which number of users having a use history is one and a case where the number of users having a use history is plural and a change is made to the individual job history of the user having the highest use frequency, a large number of uses, or a use date and time closest to a current time will be described. For example, a case where the shared job history of the user A is changed to the individual job history of the user F due to the above reason will be described.

Figure 13:
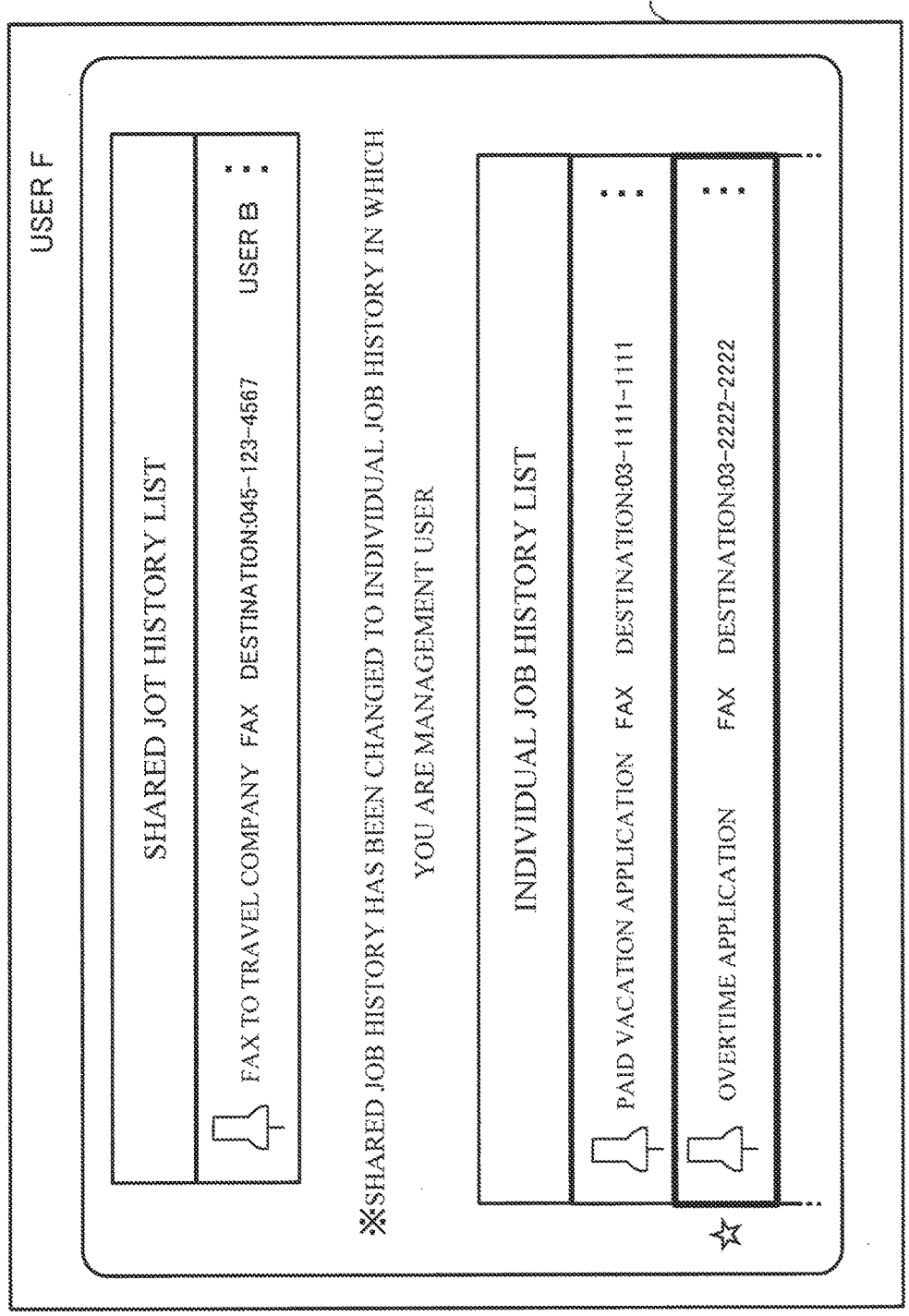
FIG. 13 is a diagram illustrating a list screen example of a job history when a user F logs in in a case in which the shared job history of the user A is changed to the individual job history of the user F.

An example of a list screen of job histories when the user F logs in in such a case is illustrated in FIG. 13. Referring to FIG. 13, it can be understood that, since the shared job history to be deleted is changed to an individual job history in which the user F is a management user, a pinned job history of "overtime application" is displayed on the list screen of job history of the job F.

The job history in which the user F is set as the management user is generated while the user F is not aware of the job history. Therefore, when the user F first displays the job list screen, a message "Shared job history has been changed to individual job history in which you is management user." is displayed as illustrated in FIG. 13 to notify that the individual job history information in which the user F is the management user has been generated.

When the shared job history is changed to individual job history information of a user having a use history in this way, a plurality of pieces of individual job history information in which each user is a management user may be generated without selecting only one user from the plurality of users in a case in which there are a plurality of users having a use history.

For example, as illustrated in FIG. 14, in a case in which there are the use histories of two users E and F in the shared job history to be deleted, both the individual job history in which the user E is a management user and the individual job history in which the user F is a management user may be generated.

Figure 15:
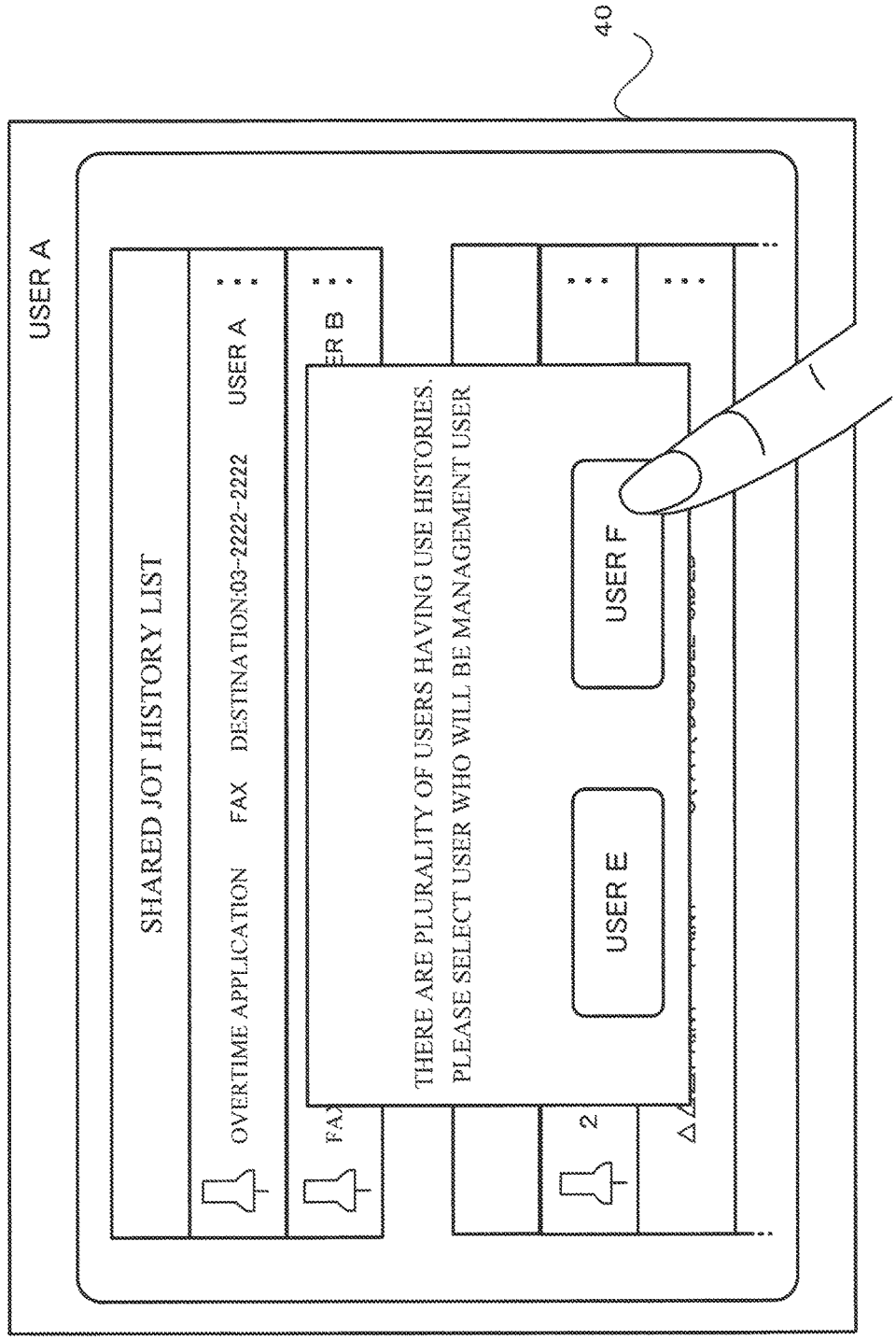
FIG. 15 is a diagram illustrating a display screen example when the user A who is an original user selects whether to change an individual job history to an individual job history in which a certain user is a management user in a case in which there are use histories of a plurality of users in a shared job history to be deleted.

In a case in which there are use histories of a plurality of users in the shared job history to be deleted, a display screen as illustrated in FIG. 15 may be displayed so that the user A who is the original user can select whether to change the individual job history to the individual job history in which a certain user is the management user.

Figure 16:
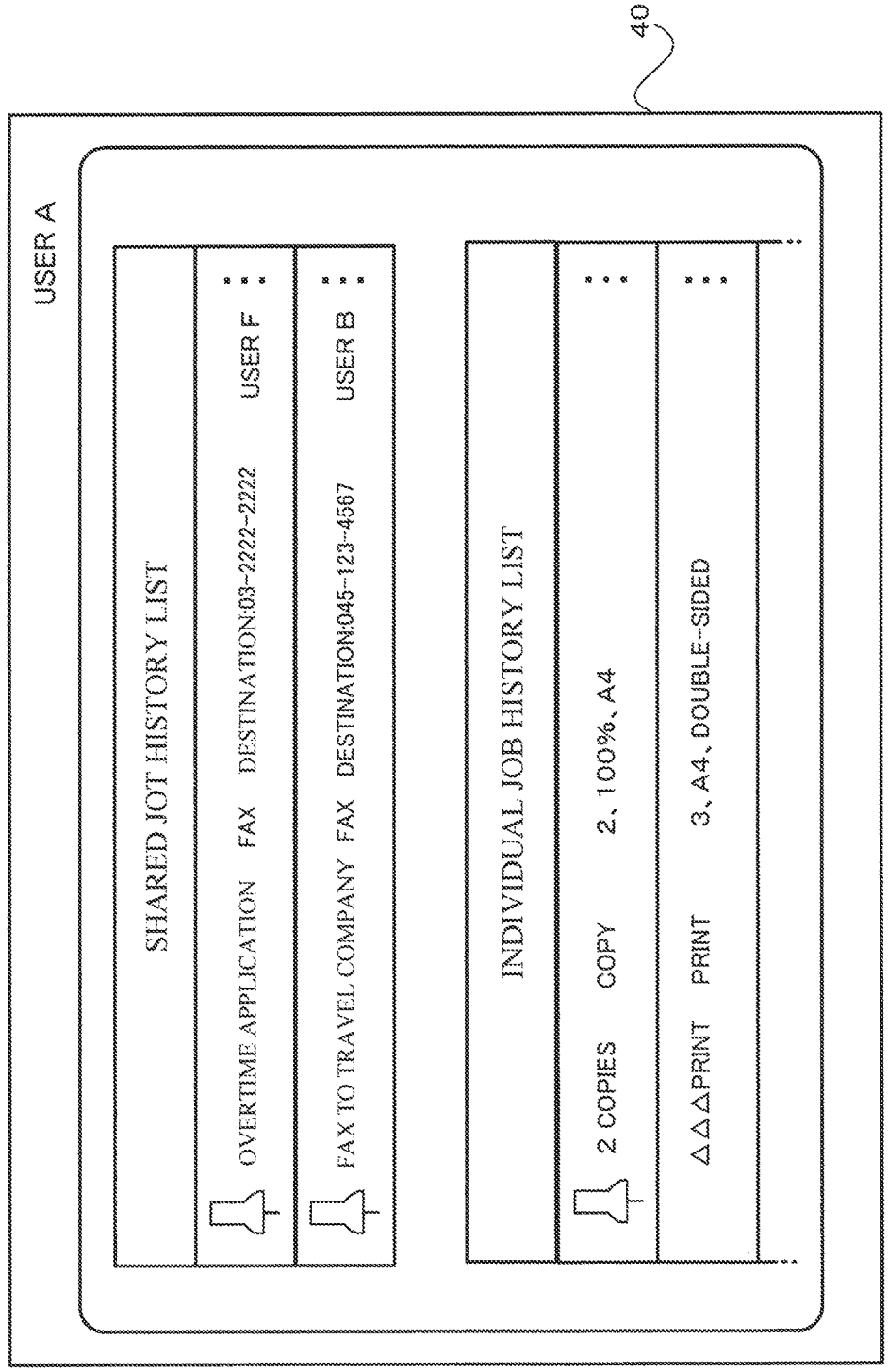
FIG. 16 is a diagram illustrating a display screen example in a case in which a shared job history in which an original management user is the user A is changed to a shared job history in which the user F is a management user.

In this regard, in a case in which there are use histories of the plurality of users in the shared job history to be deleted, the use history may be left as a shared job history in which another user is a management user. For example, FIG. 16 illustrates a display screen example in a case in which the shared job history in which the original management user is the user A is changed to a shared job history in which the user F is the management user. Through the change, the user E can use the shared job history even after the management user is changed from the user A to the user F.

Figure 17:
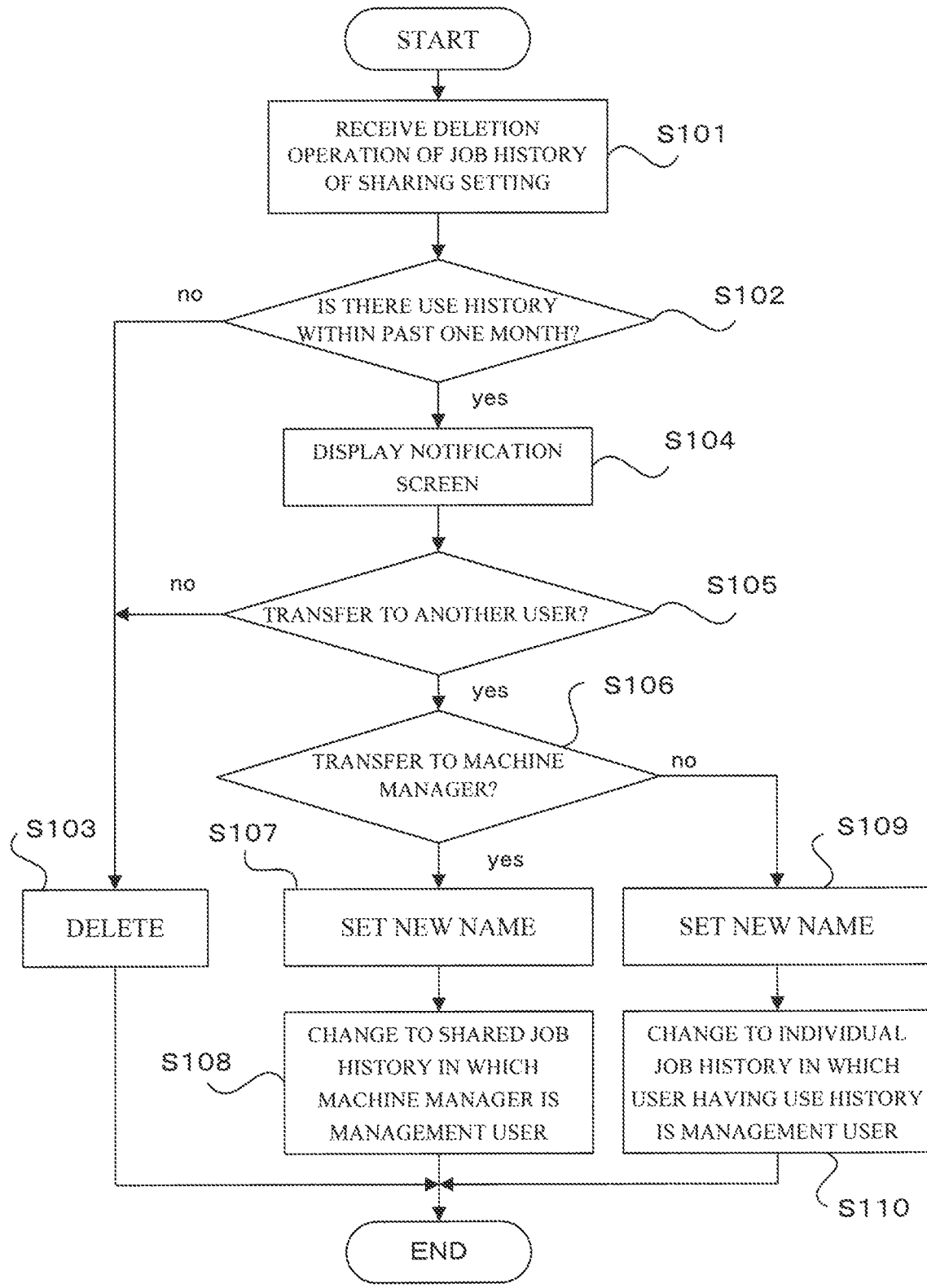
FIG. 17 is a flowchart illustrating an operation of the image forming device 10 according to the embodiment of the present disclosure.

Finally, an operation of the image forming device 10 in the present embodiment will be described with reference to the flowchart of FIG. 17.

First, in step S101, the controller 35 receives a deletion operation of the job history of the sharing setting via the operation input unit 32.

Then, in step S102, the controller 35 determines, for example, whether or not there is a use history of another user within the past one month with reference to the shared job history information management table stored in the job history storage unit 37.

Then, in a case in which it is determined in step S102 that there is no use history of another user within the past one month, the controller 35 deletes the shared job history for which the deletion operation has been received in step S103.

Then, in a case in which it is determined in step S102 that there is the use history of another user within the past one month, the controller 35 displays the notification screen as illustrated in FIG. 10 on the operation panel 40 in step S104.

Then, in step S105, the controller 35 receives a selection operation from a user who has viewed the notification screen, and determines whether or not transferring of the shared job history to be deleted to another user has been selected.

Here, in step S105, in a case in which the original user does not select the transfer to another user, that is, in a case in which a deletion instruction is given, the controller 35 deletes the shared job history in step S103.

Then, in a case in which the original user selects the transfer to another user in step S105, the controller 35 further determines in step S106 whether or not transferring of the shared job history to the machine manager is selected.

Here, in a case in which the original user selects the transfer to the machine manager in step S106, the controller 35 changes the shared job history to a shared job history in which the machine manager is a management user in step S108 after the setting of a new name is received in step S107.

Then, in a case in which the original user does not select the transfer to the machine manager in step S106, that is, in a case in which the original user selects the transfer to the user having the use history, the controller 35 changes the shared job history to the shared job history in which the user having the use history is the management user in step S110 after the setting of the new name is received in step S109.

In each of the above-described embodiments, a processor is a processor in a broad sense and includes a general-purpose processor (for example, a central processing unit (CPU) or the like) or a dedicated processor (for example, a graphics processing unit (GPU), an application specific integrated circuit (ASIC), a field programmable gate array (FPGA), a programmable logic device, and the like).

An operation of the processor in each of the above-described embodiments may be executed not only by one processor but also by a plurality of processors which are located at physically separated positions in cooperation. An order of each operation of the processor is not limited to the order described in each of the above embodiments, and may be changed if appropriate.

MODIFIED EXAMPLE

In the above embodiment, the case where the present disclosure is applied to an image forming device that forms an image on a recording medium has been described. However, the present disclosure is not limited to this, and the present disclosure can be similarly applied to an information processing device such as an individual computer or a portable terminal device that stores process execution information for executing a preset process and executes a process using the stored process execution information.

The disclosure of Japanese Patent Application No. 2021 027638 filed on Feb. 24, 2021 is incorporated herein by reference in its entirety. All documents, patent applications, and technical standards described in this specification are incorporated herein by reference to the same extent as if each document, patent application, and technical standard were specifically and individually indicated to be incorporated by reference.

The invention claimed is:

1. An information processing device comprising a processor,
wherein, in a case in which the processor receives an instruction to delete process execution information in which a sharing setting available to a plurality of users is made from among pieces of process execution information for executing a present process, the processor gives a notification that there is a use history of another user in a case in which there is the use history of the other user other than a management user of the process execution information.

2. The information processing device according to claim 1, wherein the processor deletes the process execution information in a case in which the processor receives an instruction to delete the process execution information by the management user who has given the notification.

3. The information processing device according to claim 1, wherein, in a case in which the processor receives an instruction to change the management user and leave the process execution information without deleting the process execution information by the management user who has given the notification, the processor changes the process execution information to process execution information of a sharing setting in which a preset user is the management user.

4. The information processing device according to claim 3, wherein the preset user is a machine manager preset as a manager of the information processing device.

5. The information processing device according to claim 1, wherein, in a case in which the processor receives an instruction to change the management user and leave the process execution information without deleting the process execution information by the management user who has given the notification, the processor changes the process execution information to process execution information of an individual setting that is available only to another user having a use history as the management user.

6. The information processing device according to claim 5, wherein, in a case in which new process execution information is generated, when a user set as the new management user of the process execution information displays a list screen of the process execution information, the processor gives a notification that the process execution information in which the user is a management user has been generated.

7. The information processing device according to claim 1, wherein the processor receives an instruction to change the management user and leave the process execution information without deleting the process execution information by the management user who has given the notification, and in a case in which there is a plurality of other users having a use history of the process execution information, the processor changes the process execution information to process execution information of a sharing setting in which another user selected from the plurality of other users is the management user.

8. The information processing device according to claim 7, wherein the processor selects, as the management user of the process execution information, a user having a highest use frequency or a user having a largest number of uses among a plurality of other users having the use history of the process execution information.

9. The information processing device according to claim 7, wherein the processor sets, as a new management user of the process execution information, a user selected by an original management user from a plurality of other users having the use history of the process execution information.

10. The information processing device according to claim 1, wherein the processor receives an instruction to change the management user and leave the process execution information without deleting the process execution information by the management user who has given the notification, and in a case in which there is a plurality of other users having the use history of the process execution information, the processor changes the process execution information to process execution information of a plurality of individual settings in which each of the plurality of other users is a management user.

11. The information processing device according to claim 1, wherein, in a case in which a user other than a management user of the process execution information has used the process execution information a preset number of times or more within a past preset period, the processor determines that there is a use history in the process execution information.

12. The information processing device according to claim 1, wherein the process execution information is history information of process content executed previously, process execution information for sequentially executing a series of preset processes, or process execution information for executing a process with preset setting content.

13. An information processing device comprising a processor,
wherein, in a case in which the processor receives an instruction to delete process execution information in which a sharing setting available to a plurality of users is made from among pieces of process execution information for executing a present process, the processor changes the process execution information to process execution information of an individual setting in which another user is a management user in a case in which there is a use history of the other user other than the management user of the process execution information.

14. A non-transitory computer-readable storage medium storing a program executable by a computer to perform processing comprising:
receiving an instruction to delete process execution information in which a sharing setting available to a plurality of users is made from among pieces of process execution information for executing a present process; and
giving a notification that there is a use history of another user other than a management user of the process execution information in a case in which there is the use history of the other user other than the management user of the process execution information.

15. A non-transitory computer-readable storage medium storing a program executable by a computer to perform processing comprising:
receiving an instruction to delete process execution information in which a sharing setting available to a plurality of users is made from among pieces of process execution information for executing a present process; and
changing the process execution information to process execution information of an individual setting in which another user is a management user in a case in which there is a use history of the other user other than the management user of the process execution information.

* * * * *